United States Patent [19]

Furukawa et al.

[11] Patent Number: 4,767,732
[45] Date of Patent: Aug. 30, 1988

[54] HIGH DIELECTRIC CONSTANT CERAMIC MATERIAL AND METHOD OF MANUFACTURING THE SAME

[75] Inventors: Osamu Furukawa, Sagamihara; Seiichi Yoshida, Katsushika; Motomasa Imai, Inagi; Mitsuo Harata, Kawasaki, all of Japan

[73] Assignee: Kabushiki Kaisha Toshiba, Kawasaki, Japan

[21] Appl. No.: 90,605

[22] Filed: Aug. 28, 1987

[30] Foreign Application Priority Data

Aug. 28, 1986 [JP] Japan .................. 61-199963
Jul. 6, 1987 [JP] Japan .................. 62-167034

[51] Int. Cl.$^4$ ................................. C04B 35/46
[52] U.S. Cl. ............................ 501/137; 501/134; 501/135; 501/136; 501/138; 501/139
[58] Field of Search ............ 501/134, 135, 136, 137, 501/138, 139; 423/598; 252/62.9

[56] References Cited

U.S. PATENT DOCUMENTS

2,563,307  8/1951  Burnham et al. .............. 501/137
4,500,942  2/1985  Wilson ........................ 501/138

FOREIGN PATENT DOCUMENTS

55-51759    4/1980  Japan.
55-144609  11/1980  Japan.
57-57204    4/1982  Japan.
58-217462  12/1983  Japan.
59-203759  11/1984  Japan.

OTHER PUBLICATIONS

Japanese Journal of Applied Physics, Col. 24 (1985, Supplement 24-2, pp. 427–429.

*Primary Examiner*—William R. Dixon, Jr.
*Assistant Examiner*—Anthony Green
*Attorney, Agent, or Firm*—Foley & Lardner, Schwartz, Jeffery, Schwaab, Mack, Blumenthal & Evans

[57] ABSTRACT

To obtain a ceramic material having a high dielectric constant (K=2300 to 7000), a high insulation resistance (CR=4000 to 18000 ohmF), a low temperature dependence (±10%) to (±22, −33%) upon dielectric constant over a wide temperature range (−55 and +125° C.) and a relatively low sintering temperature (1000° C. to 1250° C.), BaTiO$_3$ powder at least 50 wt % of which is 0.7 to 3 μm in particle size) is mixed with another compound with perovskite structure mainly composed of oxides of Pb, Ba, Sr, Zn, Nb, Mg and Ti before sintering. Further, part of Ti of BaTiO$_3$ is substitutable with Zr or Sn, and part of Ba of BaTiO$_3$ is substitutable with Sr, Ca or Ce.

11 Claims, 2 Drawing Sheets

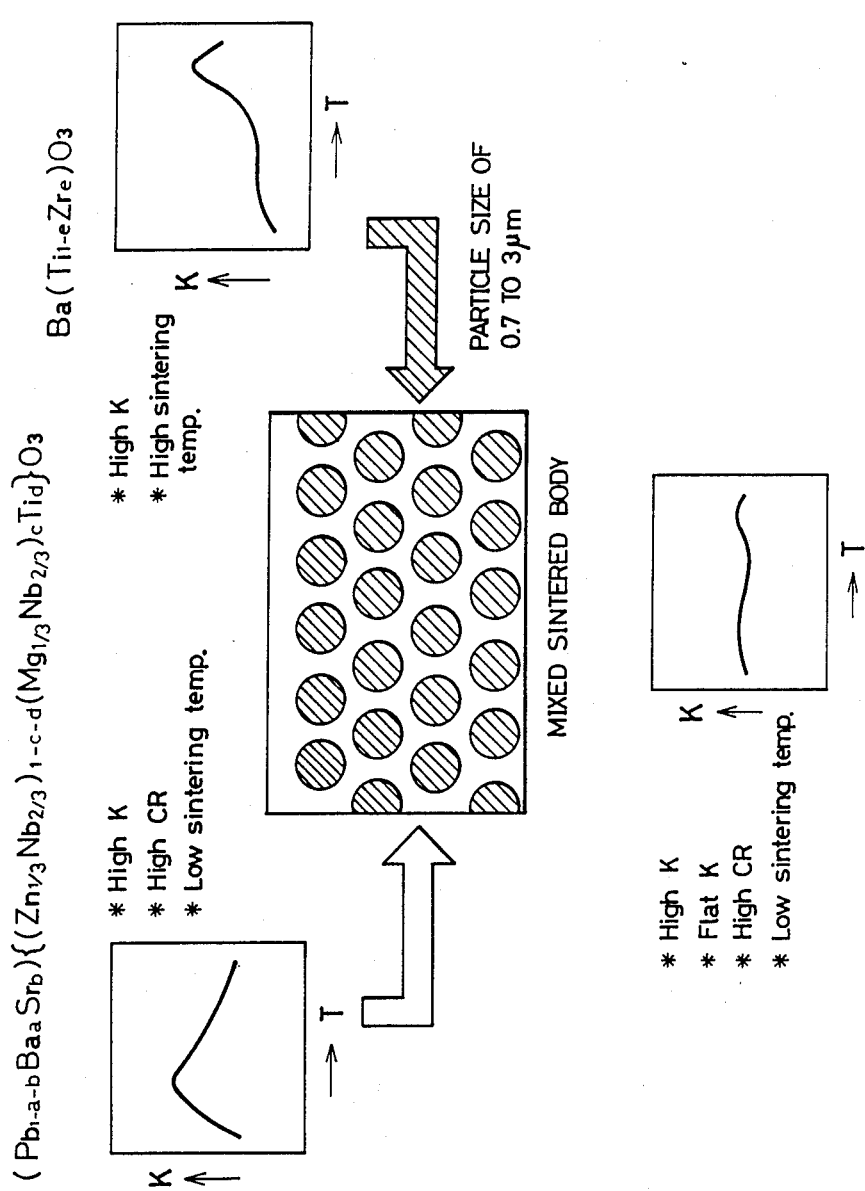

HIGH DIELECTRIC CONSTANT CERAMIC MATERIAL AND METHOD OF MANUFACTURING THE SAME

BACKGROUND OF THE INVENTION

1. Field of the Invention

The present invention relates to a high dielectric constant ceramic material, and a method of manufacturing the same, and more specifically to a high dielectric constant ceramic material having a small temperature dependence of dielectric constant over a wide temperature range in particular, and the method of manufacturing the same.

2. Description of the Prior Art

As characteristic items required for dielectric material, there are high dielectric constant, low dielectric constant vs. temperature dependence, low dielectric loss (dissipation factor) small bias voltage dependence of dielectric constant, high capacitance-resistance product, etc.

Among these items, in particular, a sufficiently high capacitance-resistance product (CR product) is required. For instance, Standards of the Electronic Industries Association of Japan prescribes a CR product as high as 500 Mohm.μF at room temperature in the Standards RC-3698B entitled Multilayer Ceramic Chip Capacitors for Electronic Applications. Further, MIL-C-55681 prescribes high CR product values even at a high temperature such as 125° C.

Furthermore, stable temperature characteristics (dependence) are required over a wide temperature range. For instance, capacitance change is prescribed as ±15% or less within a temperature range of −55° to +125° C. in X7R characteristics in the Standards of Electronic Industries Association (EIA), U.S.A., as shown in FIG. 1.

In the case of multilayer-type elements, since the internal electrode layers and the dielectic layers are sintered simultaneously (cofired) in the form as shown in FIG. 2, it is necessary to use an electrode material stable at the sintering temperature of the dielectric material. Therefore, when the sintering temperature of the dielectric material is high, expensive electrode materials such as Pt, Pd, etc. should be used. In other words, there exists a need for a dielectric material sinterable at a relatively low temperature of 1100° C. or less so that low-cost material such as Ag is usable as internal electrode material.

In the conventional high dielectric constant ceramic materials, barium titanate (BaTiO₃) is generally used as a base material, and stannate, zirconate, titanate, etc. are solid-soluted thereinto.

However, since the sintering temperature of the barium titanate based material is as high as 1300° C. to 1400° C., high-temperature resistant, high-cost material such as platinum or paradium should be used for the internal electrodes, thus resulting in increased cost.

To improve the above-mentioned disadvantages involved in barium titanate, various compositions have been developed. For instance, Japanese Published Unexamined (Kokai) Pat. (referred to as JPUP) No. 57-57204 discloses a ceramic dielectric composition mainly composed of lead iron niobate; JPUP No. 55-51759 discloses one mainly composed of lead magnesium niobate; JPUP. No. 55-144609 discloses one mainly composed of lead magnesium tungstate; and JPUP No. 58-217462 discloses one mainly composed of lead magnesium/iron/tungstate.

However, no high dielectric constant ceramic material has so far been obtained such that the dielectric constant is high; the temperature dependence is small over a wide temperature range as −55° to +125° C.; and the insulation resistance is high; that is, the various electric characteristics are excellent and further low temperature sintering is enabled.

On the other hand, some research has been done to obtain flat temperature characteristics by mixing compositions having different dielectric constant temperature characteristics. For instance, JPUP No. 59-203759 discloses a mixture of Pb(Mg⅓Nb⅔)O₃-Pb(Mn½W½)O₃ based material, and Pb(Mg⅓Nb⅔)O₃-PbTiO₃-Pb(Fe⅔W⅓)O₃ based material. However, this mixture has a large temperature coefficient of dielectric constant (T.C.C.) and insufficient temperature characteristics. Further, Japanese Journal of Applied Physics, vol. 24 (1985) Supplement 24-2, pp. 427–429 discloses a mixture of Pb(Fe½Nb½)O₃ and Pb(Fe⅔W⅓)O₃. However, the CR product which is important for a capacitor material is not considered; the T.C.C. thereof is high and the temperature characteristics are insufficient.

SUMMARY OF THE INVENTION

With these problems in mind, therefore, it is the primary object of the present invention to provide a high dielectric constant ceramic material that is high in dielectric constant and insulation resistance, small in temperature dependence, and sinterable at low temperature, which is suitable for use in high-performance low-cost ceramic capacitors.

To achieve the above-mentioned object, a high dielectric constant ceramic material according to the present invention comprises a ceramic composition expressed by the following formula as

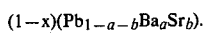

where

| |
|---|
| 0 ≦ a ≦ 0.35 |
| 0 ≦ b ≦ 0.35 |
| 0.01 ≦ a + b ≦ 0.35 |
| 0 ≦ c ≦ 0.9 |
| 0 < d ≦ 0.5 |
| 0 < c + d < 1.0 |
| 0.3 ≦ x ≦ 0.65 |

In manufacturing the above-mentioned ceramic composition, at least 50 wt% or more barium titanate (BaTiO₃) powder used as a raw material has a particle size of 0.7 to 3 μm in particle size.

Further, part of the Ti of BaTiO₃ can be subtituted for by Zr expressed by the following formula as

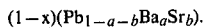

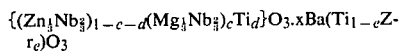

where

| |
|---|
| 0 ≦ a ≦ 0.35 |
| 0 ≦ b ≦ 0.35 |

-continued $$0.01 \leq a + b \leq 0.35$$
$$0 \leq c \leq 0.9$$
$$0 < d \leq 0.5$$
$$0 < e \leq 0.06$$
$$0.3 \leq x \leq 0.65$$
$$0 < c + d < 1.0$$

Or else, part of Ti of $BaTiO_3$ can be substituted for by Sn.

Furthermore, part of the Ba of $BaTiO_3$ can be substituted for by Sr, Ca or Ce.

It is another object of the present invention to provide a method of manufacturing a high dielectric constant ceramic material which has the above features.

To achieve the above-mentioned object, the method of manufacturing a high dielectric constant ceramic material comprises the following steps of: (a) weighing $BaCO_3$ and $TiO_2$ at a ratio in order that barium titanate can be formed; (b) mixing and calcining the weighed $BaCO_3$ and $TiO_2$ at 1000° to 1350° C.; (c) crushing the calcined barium titanate in such a way that at least 50 wt% of the barium titanate is 0.7 to 3 $\mu$m in particle size, to obtain a first compound based on barium titanate; (d) weighing oxides of Pb, Ba, Sr, Zr, Nb, Mg, and Ti at a predetermined mixture ratio; (e) mixing and calcining the weighed oxides at 700° to 900° C.; (f) crushing the calcined oxides into powder having particle size smaller than 0.7 $\mu$m, to obtain a second compound of lead perovskite relaxor with perovskite structure with a Curie point of 125° C. or lower; (g) weighing the first and second compounds at a predetermined ratio; (h) mixing the weighed first and second compounds; (i) forming the mixed compound into a predetermined shape; and (j) sintering the formed composition at a low temperature from 1000° to 1250° C.

BRIEF DESCRIPTION OF THE DRAWINGS

FIG. 3 is an illustration for assistance in explaining the features of the high dielectric constant ceramic material of the present invention, in which a first compound of lead perovskite relaxor with perovskite structure is mixed with a second compound based on barium titanate power, at least 50 wt% has a particle size of from 0.7 to 3 $\mu$m.

DETAILED DESCRIPTION OF THE PREFERRED EMBODIMENTS

Figure 1:
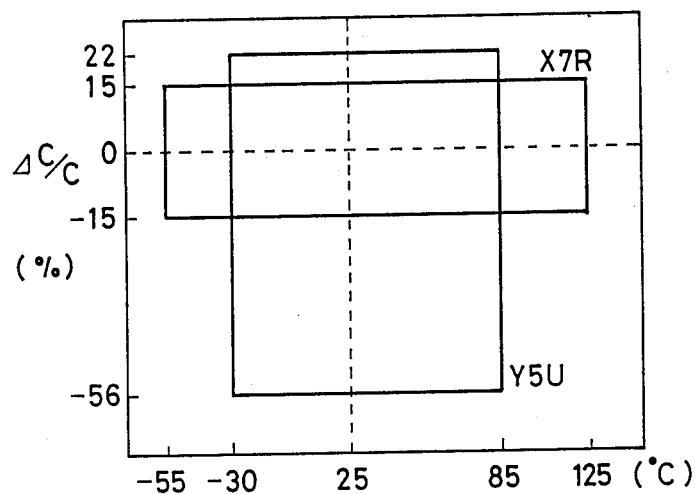
FIG. 1 is a graphical representation showing temperature characteristics or dependences of capacitors prescribed by X7R and Y5U in the Standards of Electronic Industries Association. U.S.A.
Figure 2:
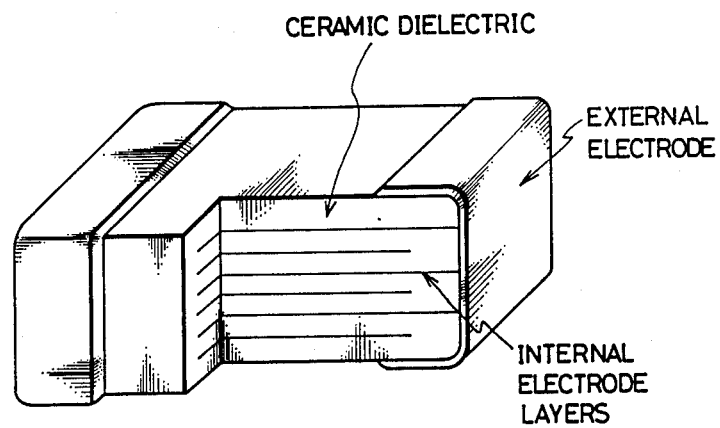
FIG. 2 is a perspective partially cut-out view showing a typical prior-art capacitor made of dielectric ceramic material.

FIG. 3 shows the features of the high dielectric constant ceramic material of the present invention in the form of illustration. In the illustration, a first compound expressed by $Ba(Ti_{1-e}Zr_e)O_3$ is provided with a high dielectric constant, a high sintering temperature and a large dielectric constant temperature dependence as shown by the right-side graph. The second compound expressed by $(Pb_{1-a-b}Ba_aSr_b)\{(Zn_{\frac{1}{3}}Nb_{\frac{2}{3}})_{1/c-d}(Mg_{\frac{1}{3}}Nb_{\frac{2}{3}})_cTi_d\}O_3$ is provided with a high dielectric constant, a high insulation resistance, a low sintering temperature and a large dielectric temperature dependence as shown by the left-side graph.

Here, it should be noted that the particle size of the first compound is determined within a range of 0.7 to 3 $\mu$m. When these two compounds are mixed at a mixture ratio x as (1st compound)$_x$ (2nd compound)$_{1-x}$ and sintered simultaneously, it is possible to obtain a mixed sintered body provided with a high dielectric constant K, a high CR value, a low sintering temperature and a flat dielectric temperature dependence as shown by the middle graph.

Further, where small temperature dependence is important, it is preferable to determine the mixture ratio as $0.5 < X \leq 0.65$. On the other hand, where the low sintering temperature is important, it is preferable to determine the mixture ratio as $0.3 \leq X \leq 0.5$.

The material of the present invention will be described in further detail hereinbelow.

In general, a high dielectric constant ceramic material can be obtained in accordance with the following steps: oxides of Pb, Ba, Sr, Zn, Mg, Nb, Ti, etc. (raw material), salt such as carbonate or oxalate changeable into oxide by firing, hydroxides or organic compounds also changeable into oxides by firing are weighed by a balance in predetermined proportion; mixed sufficiently; calcinated; and crushed into raw material powder. The material powder thus obtained is formed into a desired shape and then sintered to obtain a high dielectric constant ceramics.

Instead of the above-mentioned general method, a raw material including at least $BaTiO_3$ powder as a raw material powder and another component are mixed before sintering in the present invention. The high dielectric constant ceramic composition manufactured as described above can reduce the temperature dependence of dielectric constant.

In more detail, the manufacturing method of the present invention comprises the following steps of: oxides of Ba and Ti constituting $BaTiO_3$ as starting materials, salts such as carbonate or oxalate, hydroxide or organic compound which are changeable to oxide by firing, are previously prepared so as to satisfy a chemical formula of $BaTiO_3$, and then calcined at 1000° to 1350° C. In this step, little mismatching can be permitted in stoichiometric ratios of the components. The calcined powder and the second starting materials are weighed at predetermined proportions, mixed sufficiently, and crushed. In this process, it is preferable to use resin-coated balls to prevent the $BaTiO_3$ powder from being crushed excessively. Further, it is preferable to mix the second starting materials mainly composed of Pb (Ba and Ti can be included) and to calcinate them separately at 700° to 900° C. Further, there exists no problem even if a few other elements are included in powder which constitutes $BaTiO_3$.

Powder sufficiently mixed and crushed is formed into a desired shape, and then sintered into a high dielectric constant ceramic composition.

Further, it is preferable to use balls such as partially stabilized zirconia balls having high hardness and rigidity in mixing and crushing the calcined powder and the second starting materials to prevent impurities and contamination from being mixed therewith. Further, when a first component mainly composed of $BaTiO_3$ and a second component with perovskite structure mainly composed of Pb are mixed, it is preferable to use resin coated balls to prevent the over-crushing of $BaTiO_3$.

The ceramic composition thus obtained is a mixed sintered body of a first component mainly composed of $BaTiO_3$ and a second component with perovskite structure mainly composed of Pb. Since the first compound of BaTiO₃ has a Curie point of about 125° C., and due to a multiplication effect in relation to the second component mainly composed of Pb, excellent temperature characteristics or small temperature dependence in the present ceramic composition can be obtained. Further, the present ceramic composition is high in dielectric constant and CR product, and therefore suitable for use in capacitors.

If the BaTiO₃ powder is excessively fine, first and second components are excessively diffused in sintering, which tends to prevent an improvement in temperature characteristics. If excessively coarse, pore cracks excessively increase in the sintered body, thus resulting in low CR product, low mechanical strength, and low production yield due to non-uniform composition especially when multilayer capacitors are fabricated.

Therefore, it is desirable that 50 wt% or more BaTiO₃ powder is 0.7 to 3 μm, preferably 0.8 to 2 μm in particle size. The method of controlling the particle size is as follows: when the particle size is large, for instance, the crushing conditions by ball mill are modified. When the particle size is small, the calcining or prefiring condition is adjusted.

Further, the Curie point of the second component is determined as 125° C. or less under consideration of the temperature characteristics of BaTiO₃, and further as room temperature to 80° C. under consideration of the mutual reaction of the first and the second components. Further, it is preferable to use a second component with a Curie point lower than room temperature when the sintering temperature must to be lowered (e.g. 1100° C. or lower).

Further, in order to change the Curie point, it is possible to substitute a part of Ba with Sr, Ca or Ce or a part of Ti with Zr or Sn in the BaTiO₃ powder.

The composition of the present invention will be described hereinbelow. The composition can be expressed by the following general formula:

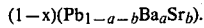

$(1-x)(Pb_{1-a-b}Ba_aSr_b)$·

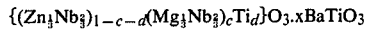

$\{(Zn_{\frac{1}{3}}Nb_{\frac{2}{3}})_{1-c-d}(Mg_{\frac{1}{3}}Nb_{\frac{2}{3}})_cTi_d\}O_3 \cdot xBaTiO_3$ In the above formula, only a small amount of substitution for the Pb by Ba and Sr can form a perovskite structure. However, when (a+b) is 0.01 or less, a perovskite structure is not easily formed and therefore the dielectric constant is lowered. When (a+b) is 0.35 or more, the sintering temperature increases. If c and d are out of the above ranges, the temperature dependence of the dielectric constant increases. Further, it is preferable that the $(Zn_{\frac{1}{3}}Nb_{\frac{2}{3}})$ component is included to some extent, c+d≦0.9 is preferable. If x exceeds 0.65, the sintering temperature rises; if below 0.3, the temperature dependence of the dielectric constant increases. In particular, when the temperature dependence is important, 0.5<X≦0.65 is preferable; when the sintered temperature is important, 0.3≦X≦0.5 is preferable.

When the constants a, b, c, d and x are restricted within the above ranges, it is possible to obtain a ceramic composition which has a large dielectric constant, small in dielectric constant temperature dependence over a wide temperature range, high insulation resistance, and, for example a sintering temperature as low as 1150° C.

As long as the composition of the present invention is mainly composed of

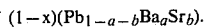

$(1-x)(Pb_{1-a-b}Ba_aSr_b)$·

$\{(Zn_{\frac{1}{3}}Nb_{\frac{2}{3}})_{1-c-d}(Mg_{\frac{1}{3}}Nb_{\frac{2}{3}})_cTi_d\}O_3 \cdot xBaTiO_3,$ the above stoichiometric component ratios are not so severe.

The above oxides can be calculated in terms of weight percentage as follows:

| | |
|---|---|
| PbO | 26.49 to 53.33 wt % |
| BaO | 15.01 to 39.48 wt % |
| SrO | 0.00 to 9.71 wt % |
| ZnO | 0.49 to 6.86 wt % |
| MgO | 0.00 to 3.14 wt % |
| Nb₂O₅ | 8.00 to 23.03 wt % |
| TiO₂ | 7.81 to 23.64 wt %. |

More preferably,

| | |
|---|---|
| PbO | 26.49 to 52.58 wt % |
| BaO | 15.01 to 39.07 wt % |
| SrO | 0.00 to 9.57 wt % |
| ZnO | 0.49 to 6.86 wt % |
| MgO | 0.00 to 3.14 wt % |
| Nb₂O₅ | 8.00 to 23.03 wt % |
| TiO₂ | 7.81 to 23.39 wt %. |

Among these, a composition in which part of Ti is substituted with Zr is preferable, because a drop in dielectric constant near the Curie point is small. Therefore, $Ba(Ti_{1-e}Zr_e)$ can be used instead of BaTiO₃. In this case, however, the substitution amount of Zr is 6 mol% (0≦e≦0.06) at most. This is because T.C.C. (temperature coefficient of dielectric constant) increases at a high temperature when ceramics composed of the mixed sintered body is formed, if the amount of Zr is beyond 6 mol%.

Further, when the above composition is calculated in terms of weight percentage of oxides,

| | |
|---|---|
| PbO | 19.28 to 40.35 wt % |
| BaO | 26.73 to 46.73 wt % |
| SrO | 0.00 to 7.15 wt % |
| ZnO | 0.36 to 5.11 wt % |
| MgO | 0.00 to 2.33 wt % |
| Nb₂O₅ | 5.84 to 17.11 wt % |
| TiO₂ | 13.08 to 26.64 wt % |
| ZrO₂ | 0.00 to 1.93 wt %. |

Impurities and additives may be includes as long as the effect of the present invention is not degraded. However, the content of additives such as transition elements, lanthanide elements of CaO, La₂O₃, MnO₂, CoO, NiO, Sb₂O₃, ZrO₂, and SiO₂ may be 1 wt% at the most.

In manufacturing the multilayer-type element, a binder, a solvent, etc. are mixed with the above-mentioned raw material powder or the mixed and crushed powder to obtain a slurry. The slurry is formed into a green sheet; an internal electrode paste is printed on the green sheet; a predetermined number of sheets are laminated, pressurized and sintered. In the sintering process, since the dielectric material of the present invention can be sintered at low temperature, it is possible to use a low-cost material mainly composed of Ag as the internal electrode material.

Further, since the dielectric material can be sintered at a low temperature, it is possible to effectively use this material as a thick film dielectric paste material printed and baked onto a printed circuit board.

The ceramic composition of the present invention is high in dielectric constant and small in temperature coefficient, large in CR product even at high temperature, and therefore excellent in reliability at high temperature.

Further, the bias voltage dependence upon the dielectric constant is excellent, being as low as 10% or less in 2 kV/mm. Thus, the material of the present invention is useful as dielectric material for high voltage, and further for alternating current circuits and for high frequency circuits, because the dielectric loss (dissipation factor (DF) or tan δ) is quite small.

Since the temperature characteristics of the dielectric constant are excellent, when applied to an electrostrictive element, it is possible to obtain an element having a small temperature dependence relative to displacement.

Further, since the particle size can be arranged uniformly within 0.7 to 3 μm, the breakdown voltage is also high.

The mechanical strength of the material is also excellent as well as the above electric characteristics.

EXAMPLES

Examples of the high dielectric constant material of the present invention will be described below.

The starting raw materials of $BaCO_3$ and $TiO_2$ for constituting $BaTiO_3$ are both weighed by a balance so as to form a chemical formula $BaTiO_3$, mixed by a ball mill, calcined at 1000° to 1350° C., and then crushed by the ball mill.

In this case, the particle size of $BaTiO_3$ powder thus obtained was controlled by modifying the crushing conditions of the ball mill. Further, mean particle size was measured in accordance with the Blaine method with a Blaine air permeability apparatus prescribed in Testing Method of Japanese Industrial Standard R-5201-1964.

On the other hand, oxides or hydroxides or carbonates of Pb, Ba, Sr, Zn, Ti, Mg, etc. other than $BaTiO_3$ were mixed by another ball mill, calcined at 700° to 900° C., and crushed.

Next, these calcined bodies were weighed by a balance so as to provide a predetermined proportion, and mixed in a pot mill. After drying, a binder was mixed to form granules, and the material was pressed to form a disk-shaped element with a diameter of 17 mm and a thickness of about 2 mm.

The element was sintered in air at 1000° to 1250° C. for 2 hours. (Examples 1 to 6 and Comparative Examples 1 to 2 were sintered at 1000° to 1100° C., while Examples 7 to 15 and Comparative Examples 3 to 5 were sintered at 1200° to 1250° C.) Silver electrodes were baked onto both the main surfaces to measure various characteristics. The dielectric loss (dissipation factor) and the capacitance were measured by an LCR meter at 1 kHz, 1 Vrms, and 25° C. The dielectric constants were calculated on the basis of these values. Further, the insulation resistances were calculated on the basis of values measured with an insulation resistance meter after a voltage of 100 V had been applied for 2 minutes. Further, the temperature characteristics (dependence) of the dielectric constant were expressed as the maximum change rate within a temperature range of −55° to +125° C. with reference to 25° C. The capacitance and resistance product (CR product) was obtained on the basis of (relative dielectric constant)×(insulation resistance)×(dielectric constant in a vacuum) at 25° and 125° C. The insulation resistance was measured in a silicon oil to eliminate the moisture effect induced in air.

Table 1 shows the test results of Examples 1 to 5 and 7 to 12 having a composition expressed by the general formula:

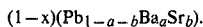

or

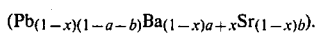

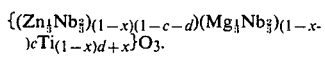

For comparison, Table 1 lists the test results of Comparative Example 1 ($BaTiO_3$ of small particle size), Comparative Example 2 ($BaTiO_3$ of large particle size), and a special Example 6 ($BaTiO_3$ is replaced with $(Ba_{0.9}Sr_{0.1})TiO_3$ having a Curie point 10° to 30° C. lower than that of pure $BaTiO_3$).

TABLE 1-a

| Sample No. | a (mol %) | b (mol %) | c (mol %) | d (mol %) | x (mol %) |
|---|---|---|---|---|---|
| Example 1 | 0 | 18 | 1 | 19 | 35 |
| Example 2 | 33 | 0 | 1 | 49 | 40 |
| Example 3 | 0 | 5 | 40 | 0 | 40 |
| Example 4 | 0 | 1 | 80 | 0 | 40 |
| Example 5 | 10 | 0 | 50 | 0 | 50 |
| Comparative 1 | 33 | 0 | 1 | 49 | 40 |
| Comparative 2 | 33 | 0 | 1 | 49 | 40 |
| Example 6 | 0 | 11 | 40 | 20 | 45 |
| Example 7 | 20 | 0 | 0 | 30 | 58 |
| Example 8 | 15 | 5 | 1 | 29 | 58 |
| Example 9 | 20 | 0 | 0 | 30 | 62 |
| Example 10 | 20 | 0 | 0 | 30 | 55 |
| Example 11 | 5 | 15 | 0 | 30 | 55 |
| Example 12 | 20 | 0 | 50 | 45 | 60 |
| Comparative 3 | 20 | 0 | 0 | 30 | 55 |
| Comparative 4 | 20 | 0 | 0 | 30 | 55 |

TABLE 1-b

| Sample No. | PbO (wt %) | BaO (wt %) | SrO (wt %) | ZnO (wt %) | MgO (wt %) | $Nb_2O_5$ (wt %) | $TiO_2$ (wt %) |
|---|---|---|---|---|---|---|---|
| Example 1 | 41.97 | 18.94 | 4.28 | 4.98 | 0.03 | 16.46 | 13.35 |
| Example 2 | 32.96 | 33.69 | 0.00 | 2.99 | 0.03 | 9.96 | 20.37 |
| Example 3 | 43.90 | 21.17 | 1.07 | 3.37 | 1.11 | 18.35 | 11.03 |
| Example 4 | 45.82 | 21.20 | 0.21 | 1.12 | 2.23 | 18.37 | 11.05 |
| Example 5 | 35.96 | 30.21 | 0.00 | 2.43 | 1.20 | 15.87 | 14.31 |
| Comparative 1 | 32.96 | 33.69 | 0.00 | 2.99 | 0.03 | 9.96 | 20.37 |
| Comparative 2 | 32.96 | 33.69 | 0.00 | 2.99 | 0.03 | 9.96 | 20.37 |
| Example 6 | 39.74 | 22.59 | 3.98 | 2.17 | 1.08 | 14.18 | 16.27 |
| Example 7 | 28.06 | 38.10 | 0.00 | 2.98 | 0.00 | 9.75 | 21.00 |
| Example 8 | 28.16 | 37.03 | 0.82 | 2.99 | 0.02 | 9.92 | 21.06 |
| Example 9 | 25.70 | 40.43 | 0.00 | 2.73 | 0.00 | 8.93 | 22.21 |
| Example 10 | 29.79 | 36.39 | 0.00 | 3.17 | 0.00 | 10.35 | 20.30 |
| Example 11 | 30.17 | 32.96 | 2.63 | 3.21 | 0.00 | 10.48 | 20.55 |
| Example 12 | 27.39 | 39.99 | 0.00 | 0.21 | 1.03 | 7.48 | 23.90 |
| Comparative 3 | 29.79 | 36.39 | 0.00 | 3.17 | 0.00 | 10.35 | 20.30 |
| Comparative 4 | 29.79 | 36.39 | 0.00 | 3.17 | 0.00 | 10.35 | 20.30 |

TABLE 1-c

| Sample No. | P. dia of BaTiO₃ (μm)³ | Dielectric constant K(25° C.) | Dielectric loss D.F(%) | CR product 25° C. (ΩF) | CR product 125° C. (ΩF) | Dielectric C. change rate (%) | | |
|---|---|---|---|---|---|---|---|---|
| | | | | | | −55° C. | +125° C. | Max. |
| Example 1 | 1.5 | 4700 | 1.2 | 13000 | 2900 | −22 | +9 | −22 |
| Example 2 | 1.5 | 5700 | 1.1 | 6500 | 1900 | −21 | +5 | −25 |
| Example 3 | 1.5 | 5700 | 1.2 | 12000 | 2600 | −21 | +9 | −21 |
| Example 4 | 1.5 | 6600 | 1.0 | 4600 | 1200 | −32 | +8 | −32 |
| Example 5 | 1.5 | 5000 | 1.1 | 8800 | 3300 | +1 | +20 | −21 |
| Comparative 1 | 0.4 | 3100 | 0.9 | 3200 | 920 | +3 | −39 | −39 |
| Comparative 2 | 6 | 5300 | 1.2 | 590 | 320 | −19 | +11 | −33 |
| Example 6 | 1.5 | 7200 | 1.0 | 17000 | 3600 | −31 | +13 | −31 |
| Example 7 | 1.5 | 2730 | 1.2 | 9100 | 3300 | −7.0 | −3.8 | −7.0 |
| Example 8 | 1.5 | 2610 | 1.1 | 13000 | 5200 | −5.9 | −9.2 | −9.2 |
| Example 9 | 1.5 | 2620 | 1.2 | 8700 | 2900 | −8.1 | +0.3 | −8.2 |
| Example 10 | 1.5 | 2920 | 1.3 | 9500 | 3800 | −6.4 | −4.8 | −6.8 |
| Example 11 | 1.5 | 2640 | 1.1 | 16000 | 6900 | −7.2 | −1.1 | −7.2 |
| Example 12 | 1.5 | 2810 | 1.4 | 11000 | 4200 | −9.2 | −2.4 | −9.9 |
| Comparative 3 | 0.4 | 1720 | 1.0 | 4600 | 1120 | +3.8 | −18.7 | −18.7 |
| Comparative 4 | 6 | 3500 | 2.3 | 890 | 430 | −24.2 | +16.1 | −24.2 |

Further, Table 2 shows the test results of Examples 13 to 15 of the composition expressed by the following formula as $$(1-x)(Pb_{1-a-b}Ba_aSr_b)\cdot\{(Zn_{\frac{1}{3}}Nb_{\frac{2}{3}})_{1-c-d}(Mg_{\frac{1}{3}}Nb_{\frac{2}{3}})_cTi_d\}O_3\cdot xBa(Ti_{1-e}Zr_e)O_3$$

or $$(Pb_{(1-x)(1-a-b)}Ba_{(1-x)a+xSr_{(1-x)b}})\{(Zn_{\frac{1}{3}}Nb_{\frac{2}{3}})_{(1-x)(1-c-d)}\cdot(Mg_{\frac{1}{3}}Nb_{\frac{2}{3}})_{(1-x)c}Ti_{(1-x)d+x(1-e)}Zr_{x\cdot e}\}O_3$$

which includes $Ba(Ti_{1-e}Zr_3)O_e$ having a Curie point 10 to 30 degrees lower than that of pure BaTiO₃, together with Comparative Example 5.

TABLE 2-a

| Sample No. | a (mol %) | b (mol %) | c (mol %) | d (mol %) | e (mol %) | x (mol %) |
|---|---|---|---|---|---|---|
| Example 13 | 30 | 0 | 80 | 5 | 5 | 60 |
| Example 14 | 0 | 30 | 10 | 40 | 50 | 55 |
| Example 15 | 20 | 0 | 0 | 30 | 5 | 58 |
| Comparative 5 | 0 | 30 | 10 | 40 | 12 | 55 |

TABLE 2-b

| Sample No. | PbO (wt %) | BaO (wt %) | SrO (wt %) | ZnO (wt %) | MgO (wt %) | Nb₂O₅ (wt %) | TiO₂ (wt %) | ZrO₂ (wt %) |
|---|---|---|---|---|---|---|---|---|
| Example 13 | 23.73 | 41.93 | 0.00 | 0.62 | 1.63 | 12.79 | 17.90 | 1.40 |
| Example 14 | 27.17 | 32.59 | 5.41 | 2.36 | 0.23 | 9.24 | 21.69 | 1.31 |
| Example 15 | 27.93 | 37.92 | 0.00 | 2.97 | 0.00 | 9.70 | 20.15 | 1.33 |
| Comparative 5 | 26.99 | 32.38 | 5.37 | 2.34 | 0.23 | 9.19 | 20.37 | 23.12 |

TABLE 2-c

| Sample No. | P. dia of TiO₃ (μm)³ | Dielectric constant K(25° C.) | Dielectric loss D.F (%) | CR product 25° C. (ΩF) | CR product 125° C. (ΩF) | Dielectric C. change rate (%) | | |
|---|---|---|---|---|---|---|---|---|
| | | | | | | −55° C. | +125° C. | Max. |
| Example 1 | 1.4 | 2350 | 1.2 | 12000 | 4500 | −3.3 | −5.8 | −6.1 |
| Example 2 | 1.4 | 2320 | 0.9 | 14000 | 5800 | −5.7 | −6.5 | −6.8 |
| Example 3 | 1.4 | 2760 | 1.1 | 18000 | 6500 | −6.6 | −2.9 | −6.6 |
| Comparative 5 | 1.4 | 2210 | 1.3 | 9600 | 2800 | −6.4 | −13.9 | −13.9 |

Table 1 indicates that the ceramic compositions of the present invention have high dielectric constant (K=4000 or more) and good temperature characteristics (+22 and −33% or less between −55° and +125° C.). Further, the CR product is as much as 5000 ohm.F (25° C.) or more, in particular 1000 ohm.F or more even at 125° C., being excellent in reliability at high temperature.

Table 1 indicates that the Comparative Example 1 of BaTiO₃ of small particle size has a small dielectric constant and a wide temperature change rate. Further, in the Comparative Example 2 of BaTiO₃ of large particle size, the CR product is reduced markedly.

Further, in the Example 6 of Ba₀.₉Sr₀.₁TiO₃ having a Curie point of about 100° C. in place of BaTiO₃, excellent characteristics have also been obtained. In addition to the substitution of BaTiO₃ with Sr, compositions having a Curie point 10° to 30° C. lower due to the substitution of BaTiO₃ with Ca, Ce, Zr and Sn have also shown excellent characteristics.

Further, Tables 1 and 2 indicate that Examples 7 to 15 are high in dielectric constant (K=2300 or more) and good in temperature characteristics (within ±10% at −55° to +125° C.). Further, in the Examples 13 to 15 using $Ba(Ti_{0.95}Zr_{0.05})O_3$ in place of $BaTiO_3$, in particular, excellent temperature characteristics as ±7.5% or less within a temperature range of −55° to +125° C. can be obtained. The CR value is also as much as 8000 ohm F (25° C.), and further 2500 ohm F or more at 125° C. in particular, thus indicating excellent reliability at high temperature.

The Comparative Example 5 is a composition using $Ba(Ti_{0.88}Zr_{0.12})O_3$ in which part of Ti is substituted with 12 mol% Zr instead of $BaTiO_3$. However, the change rate of the dielectric constant exceeds ±10% at high temperature. Therefore, it is preferable that the substitution rate of Zr lies within the range of the present invention. Further, the same results have been obtained by use of the composition having a Curie point 10° to 30° C. lower due to substitution of part of Ti with Sn or part of Ba with Sr, Ca, Ce, without substituting $BaTiO_3$ with Zr.

Further, a multilayer ceramic capacitor formed by use of a composition obtained by adding 0.25 mol MnO and CoO to the Example 3 will be described hereinbelow.

First, $BaTiO_3$ having the composition as described above and other calcined powder were weighed by a balance in a predetermined proportion, mixed into slurry by adding an organic solvent and a binder, and formed into a 30 μm thick green sheet with a doctor blade casting machine. On this green sheet, a 70Ag/30Pd electrode paste was printed into a predetermined pattern and 20 sheets having the above electrode pattern were stacked and laminated. Thereafter, the laminated sheet was cut into a predetermined shape, heated to burn out the binder and sintered at 1080° C. for 2 H. After sintering, an Ag paste was baked as external electrodes to manufacture multilayer ceramic capacitors. The electric characteristics are listed in Table 3 below.

TABLE 3

| Shape | 1.6 × 3.2 × 0.9 (mm³) |
|---|---|
| Thickness per layer | 20 (μm) |
| Capacitance | 0.17 (μF) |
| Dielectric Loss (Dissipation Factor) | 1.0 (%) |
| Insulation resistance | 1.9 × 10⁵ (Mohm) |
| CR product | |
| (25° C.) | 32000 (ohmF) |
| (125° C.) | 7400 (ohmF) |
| Capacitance change with reference to 25° C. | |
| (−55° C.) | −20% |
| (125° C.) | +8% |

The dielectric constant of the obtained multilayer ceramic capacitor was about 5700. Table 3 indicates that the characteristics are sufficiently excellent. In particular, the temperature characteristics lie within ±22% or less between −55° and +125° C., which satisfies X7S characteristics in EIA Standards.

Further, a multilayer ceramic capacitor formed by use of a composition obtained by adding 0.1 mol MnO and CoO to the Example 15 will be described hereinbelow.

First, $BaTi_{0.95}Zr_{0.05}O_3$ having the composition as described above and other calcined powder were weighed by a balance in a predetermined proportion, mixed into slurry by adding an organic solvent and a binder, and formed into a 30 μm thick green sheet with a doctor blade casting machine. On this green sheet, a 70Pd/30Ag electrode paste was printed in a predetermined pattern and 20 sheets having the above electrode pattern were stacked and laminated. Thereafter, the laminated sheet was cut into a predetermined shape, heated to burn out the binder and sintered at 1220° C. for 2 H. After sintering, an Ag paste was baked as external electrodes to manufacture multilayer ceramic capacitors. The electric characteristics are listed in Table 4 below.

TABLE 4

| Shape | 1.6 × 3.2 × 0.9 (mm³) |
|---|---|
| Thickness per layer | 20 (μm) |
| Capacitance | 76 (μF) |
| Dielectric Loss (Dissipation Factor) | 1.1 (%) |
| Insulation resistance | 4.3 × 10⁵ (Mohm) |
| CR product | |
| (25° C.) | 33000 (ohmF) |
| (125° C.) | 7800 (ohmF) |
| Capacitance change with reference to 25° C. | |
| (−55° C.) | −5.8% |
| (125° C.) | −3.2% |

The dielectric constant of the obtained multilayer ceramic capacitor was about 2700. Table 4 indicates that the characteristics are sufficiently excellent. In particular, the temperature characteristics lie within +7.5% or less between −55° and +125° C., which satisfies X7S characteristics in EIA Standards.

As described above, since the method of manufacturing high dielectric constant ceramic material of the present invention can provide a high dielectric constant ceramic composition excellent in various characteristics such that the dielectric constant is high and dielectric constant change rate is small over a wide temperature range, the method is effective in manufacturing multilayer ceramic capacitors, in particular. Further, in the manufacturing method of the present invention, lead zinc niobate and barium titanate have been used as the main components; however, there exist some cases where similar effects as those in the present invention can be obtained by use of other components.

According to the ceramic composition and the method of the present invention, it is possible to obtain a high dielectric constant ceramic material having high insulation resistance and excellent temperature characteristics. In particular, since it is possible to obtain ceramics improving the temperature characteristics over a wide temperature range the ceramic material of the present invention is well applied to multilayer ceramic elements such as multilayer ceramic capacitors, multilayer ceramic displacement element, etc.

What is claimed is:

1. A high dielectric constant ceramic material, consisting essentially of a composition expressed by the following formula

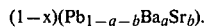

$(1-x)(Pb_{1-a-b}Ba_aSr_b).$

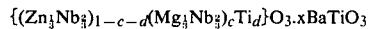

$\{(Zn_{\frac{1}{3}}Nb_{\frac{2}{3}})_{1-c-d}(Mg_{\frac{1}{3}}Nb_{\frac{2}{3}})_cTi_d\}O_3 \cdot xBaTiO_3$ where

| |
|---|
| $0 \leq a \leq 0.35$ |
| $0 \leq b \leq 0.35$ |
| $0.01 \leq a + b \leq 0.35$ |
| $0 \leq c \leq 0.9$ |
| $0 < d \leq 0.5$ |
| $0 < c + d < 1.0$ |

$0.3 \leq x \leq 0.65.$

2. The high dielectric constant ceramic material as set forth in claim 1, wherein at least 50 wt% of the $BaTiO_3$ has a particle size of 0.7 to 3 μm in particle size.

3. The high dielectric constant ceramic material as set forth in claim 1, wherein $0.3 \leq X \leq 0.5$ and $0 < c \leq 0.9$ to lower sintering temperature.

4. The high dielectric constant ceramic material as set forth in claim 1, wherein $0.5 \leq X \leq 0.65$ to reduce temperature dependence upon dielectric constant.

5. The high dielectric constant ceramic material as set forth in claim 1, wherein part of the Ti of $BaTiO_3$ is substituted for by Zr as expressed by the following formula $$(1-x)(Pb_{1-a-b}Ba_aSr_b).$$

$$\{(Zn_{\frac{1}{3}}Nb_{\frac{2}{3}})_{1-c-d}(Mg_{\frac{1}{3}}Nb_{\frac{2}{3}})_cTi_d\}O_3 \cdot xBa(Ti_{1-e}Zr_e)O_3$$

where $0 \leq a \leq 0.35$
$0 \leq b \leq 0.35$
$0.01 \leq a + b \leq 0.35$
$0 \leq c \leq 0.9$
$0 < d \leq 0.5$
$0 < e \leq 0.06$
$0.3 \leq x \leq 0.65$
$0 < c + d < 1.0.$ 6. The high dielectric constant ceramic material as set forth in claim 5, wherein $0.3 \leq X \leq 0.5$ and $0 < c \leq 0.9$ to lower sintering temperature.

7. The high dielectric constant ceramic material as set forth in claim 5, wherein $0.5 \leq X \leq 0.65$ to reduce temperature dependence upon dielectric constant.

8. The high dielectric constant ceramic material as set forth in claim 1, wherein part of the Ti of $BaTiO_3$ is substituted for by Sn.

9. The high dielectric constant ceramic material as set forth in claim 1, wherein part of the Ba of $BaTiO_3$ is substituted for by Sr.

10. The high dielectric constant ceramic material as set forth in claim 1, wherein part of the Ba of $BaTiO_3$ is substituted for by Ca.

11. The high dielectric constant ceramic material as set forth in claim 1, wherein part of the Ba of $BaTiO_3$ is substituted for by Ce.

* * * * *